United States Patent
Ma

(10) Patent No.: US 10,942,288 B2
(45) Date of Patent: Mar. 9, 2021

(54) COMPONENT-BASED LOOK-UP TABLE CALIBRATION FOR MODULARIZED RESISTIVITY TOOL

(71) Applicant: Halliburton Energy Services, Inc., Houston, TX (US)

(72) Inventor: Jin Ma, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 134 days.

(21) Appl. No.: 15/774,237

(22) PCT Filed: Aug. 7, 2017

(86) PCT No.: PCT/US2017/045753
§ 371 (c)(1),
(2) Date: May 7, 2018

(87) PCT Pub. No.: WO2019/032086
PCT Pub. Date: Feb. 14, 2019

(65) Prior Publication Data
US 2019/0079210 A1 Mar. 14, 2019

(51) Int. Cl.
*G01V 1/50* (2006.01)
*E21B 47/12* (2012.01)
(Continued)

(52) U.S. Cl.
CPC ............... *G01V 1/50* (2013.01); *E21B 47/00* (2013.01); *E21B 47/12* (2013.01); *G01V 3/26* (2013.01);
(Continued)

(58) Field of Classification Search
CPC ........ G01V 3/26; G01V 99/005; G01V 13/00; G01V 1/50; G06F 16/901; G06F 17/16; G06F 17/17; E21B 47/00
See application file for complete search history.

(56) References Cited

U.S. PATENT DOCUMENTS

| 4,800,496 A | 1/1989 | Barber et al. |
| 4,857,831 A * | 8/1989 | Davies ............... E21B 47/00 324/357 |

(Continued)

FOREIGN PATENT DOCUMENTS

| EP | 1206713 | 3/2005 |
| WO | 2013123293 | 8/2013 |
| WO | 2016179766 | 11/2016 |

OTHER PUBLICATIONS

"Real-Time Openhole Evaluation" by Barber et al. Published by Schlumberger Oilfield Review in the Summer of 1999.
(Continued)

*Primary Examiner* — Yoshihisa Ishizuka
(74) *Attorney, Agent, or Firm* — Benjamin Ford; C. Tumey Law Group PLLC

(57) ABSTRACT

Methods and systems for building a calibration database. A method may comprise hanging a logging tool in air, determining a raw response from the logging tool, decoupling a $Z_{xx}$ component and a $Z_{zz}$ component from the raw response, creating a modeled component from the $Z_{xx}$ component and the $Z_{zz}$ component, calculating an offset from the modeled component, interpolating the offset, modeling a response from the logging tool with the offset, or entering the response into a database. A system may comprise a logging tool, a conveyance, and an information handling system. A calibration system may comprise a crane, a logging tool, and an information handling system.

18 Claims, 5 Drawing Sheets

(51) Int. Cl.
    *G06F 17/17* (2006.01)
    *G06F 17/16* (2006.01)
    *G01V 99/00* (2009.01)
    *G06F 16/901* (2019.01)
    *G01V 13/00* (2006.01)
    *E21B 47/00* (2012.01)
    *G01V 3/26* (2006.01)

(52) U.S. Cl.
    CPC ............ *G01V 13/00* (2013.01); *G01V 99/005* (2013.01); *G06F 16/901* (2019.01); *G06F 17/16* (2013.01); *G06F 17/17* (2013.01)

(56) References Cited

U.S. PATENT DOCUMENTS

| | | | |
|---|---|---|---|
| 7,027,923 | B2 | 4/2006 | Barber et al. |
| 7,093,672 | B2 | 8/2006 | Seydoux et al. |
| 7,141,981 | B2 | 11/2006 | Folberth et al. |
| 7,279,889 | B1 | 10/2007 | Frey |
| 7,327,145 | B2 | 2/2008 | Haugland |
| 7,363,159 | B2 | 4/2008 | Haugland |
| 8,060,309 | B2 | 11/2011 | Xue et al. |
| 8,473,213 | B2 | 6/2013 | Zhu et al. |
| 8,890,541 | B2 | 11/2014 | Le et al. |
| 9,534,485 | B2 | 1/2017 | Yu et al. |
| 2004/0113609 | A1 | 6/2004 | Homan et al. |
| 2007/0115000 | A1 | 5/2007 | Merchant et al. |
| 2007/0205770 | A1 | 9/2007 | Fanini et al. |
| 2012/0078558 | A1* | 3/2012 | Pelegri ............... G01V 13/00 702/85 |
| 2015/0241596 | A1 | 8/2015 | Donderici |
| 2015/0301222 | A1 | 10/2015 | Davydychev et al. |
| 2016/0054468 | A1 | 2/2016 | Wu et al. |
| 2016/0170068 | A1 | 6/2016 | Donderici |

OTHER PUBLICATIONS

"ADRTM Azimuthal Deep Resistivity Sensor" product description published on Halliburton Energy Services, Inc. website. Copyright 2018.

"GeoSphere Reservoir Mapping-While-Drilling Service" Brochure published by Schlumberger on May 18, 2014.

"VisiTrak Reservoir Navigation and Analysis Service" Brochure published by Baker Hughes in Nov. 2015.

International Search Report and Written Opinion for Application No. PCT/US2017/045753 dated Feb. 26, 2018.

* cited by examiner

COMPONENT-BASED LOOK-UP TABLE CALIBRATION FOR MODULARIZED RESISTIVITY TOOL

BACKGROUND

The present disclosure relates to a method for calibrating a logging tool. Specifically, a method may be disclosed for producing a calibration database and applying the calibration database to a logging tool in a wellbore.

Wellbores drilled into subterranean formations may enable recovery of desirable fluids (e.g., hydrocarbons) using a number of different techniques. A logging tool may be employed in subterranean operations to determine wellbore and/or formation properties. A logging tool may be calibrated before being disposed in a wellbore. This may insure accurate recordings, which may be utilized to determine wellbore and/or formation properties. Currently, air-hang calibration that may comprise a crane and in-situ calibration are often used to calibrate a downhole tool. However, a logging tool may stretch over a large area and further comprise large spacing between transmitters and receivers. This may prevent an operator from properly calibrating a logging tool. Thus, this may lead to inaccurate recordings, which may skew results of wellbore and formation properties.

BRIEF DESCRIPTION OF THE DRAWINGS

These drawings illustrate certain aspects of some examples of the present disclosure, and should not be used to limit or define the disclosure.

DETAILED DESCRIPTION

The present disclosure relates generally to a method for calibrating a logging tool. More particularly, a logging tool may be calibrated from a previously determined calibration database. The calibration database may be produced from previous surface calibration methods. Calibration of the logging tool may help in determining the properties of a wellbore and/or formation accurately and efficiently. A logging tool may comprise any number of sub downhole tools, which may comprise a transmitter and/or receiver. Transmission of electromagnetic fields by the transmitter and recording of signals by the receiver may be controlled by an information handling system.

Figure 1:
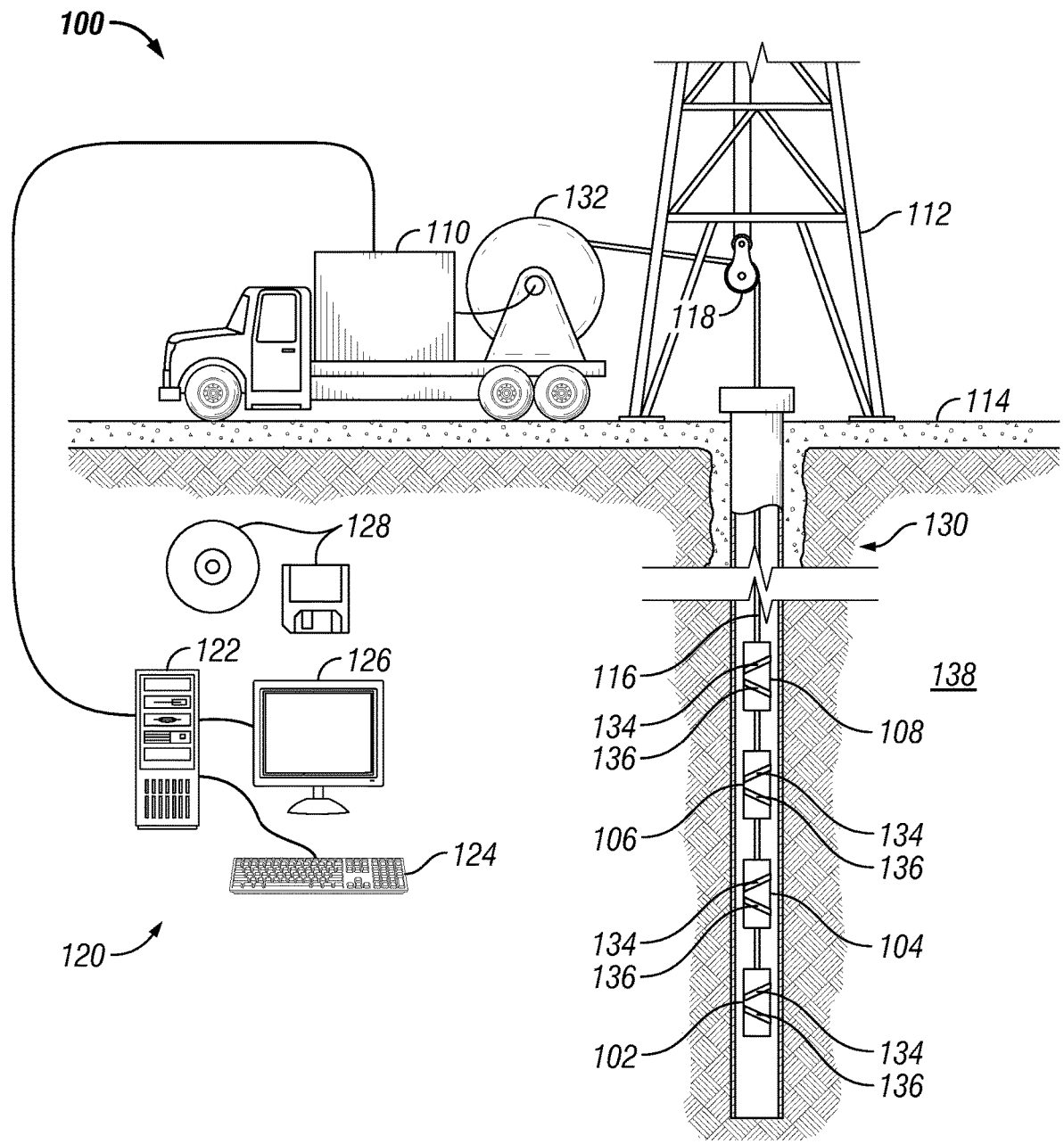
FIG. 1 illustrate an example of a well measurement system.

FIG. 1 illustrates a cross-sectional view of a well measurement system 100. As illustrated, well measurement system 100 may comprise a first downhole tool 102, a second downhole tool 104, a third downhole tool 106, and/or a fourth downhole tool 108. It should be noted that well measurement system 100 may comprise first downhole tool 102. In additional examples, there may be a plurality of downhole tools 102. As illustrated, first downhole tool 102, second downhole tool 104, third downhole tool 106, and/or fourth downhole tool 108 may attach to a vehicle 110. In examples, it should be noted that first downhole tool 102, second downhole tool 104, third downhole tool 106, and/or fourth downhole tool 108 may not be attached to a vehicle 110. First downhole tool 102, second downhole tool 104, third downhole tool 106, and/or fourth downhole tool 108 may be supported by rig 112 at surface 114. First downhole tool 102, second downhole tool 104, third downhole tool 106, and/or fourth downhole tool 108 may be tethered to vehicle 110 through conveyance 116. Conveyance 116 may be disposed around one or more sheave wheels 118 to vehicle 110. Conveyance 116 may include any suitable means for providing mechanical conveyance for first downhole tool 102, second downhole tool 104, third downhole tool 106, and/or fourth downhole tool 108, including, but not limited to, wireline, slickline, coiled tubing, pipe, drill pipe, downhole tractor, or the like. In some embodiments, conveyance 116 may provide mechanical suspension, as well as electrical connectivity, for first downhole tool 102, second downhole tool 104, third downhole tool 106, and/or fourth downhole tool 108. Conveyance 116 may comprise, in some instances, a plurality of electrical conductors extending from vehicle 110. Conveyance 116 may comprise an inner core of several electrical conductors covered by an insulating wrap. An inner and outer steel armor sheath may be wrapped in a helix in opposite directions around the conductors. The electrical conductors may be used for communicating power and telemetry between vehicle 110 and first downhole tool 102, second downhole tool 104, third downhole tool 106, and/or fourth downhole tool 108. Information from first downhole tool 102, second downhole tool 104, third downhole tool 106, and/or fourth downhole tool 108 may be gathered and/or processed by information handling system 120. For example, signals recorded by first downhole tool 102, second downhole tool 104, third downhole tool 106, and/or fourth downhole tool 108 may be stored on memory and then processed by first downhole tool 102, second downhole tool 104, third downhole tool 106, and/or fourth downhole tool 108. The processing may be performed real-time during data acquisition or after recovery of first downhole tool 102, second downhole tool 104, third downhole tool 106, and/or fourth downhole tool 108. Processing may alternatively occur downhole or may occur both downhole and at surface. In some embodiments, signals recorded by first downhole tool 102, second downhole tool 104, third downhole tool 106, and/or fourth downhole tool 108 may be conducted to information handling system 120 by way of conveyance 116. Information handling system 120 may process the signals, and the information contained therein may be displayed for an operator to observe and stored for future processing and reference. Information handling system 120 may also contain an apparatus for supplying control signals and power to first downhole tool 102, second downhole tool 104, third downhole tool 106, and/or fourth downhole tool 108.

Systems and methods of the present disclosure may be implemented, at least in part, with information handling system 120. Information handling system 120 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 120 may be a personal computer, a network storage device, or any other suitable device and may vary in size, shape, performance, functionality, and price. Information handling system 120 may include random access memory (RAM), one or more processing resources such as a central processing unit (CPU) 122 or hardware or software control logic, ROM, and/or other types of nonvolatile memory. Additional components of the information handling system 120 may include one or more disk drives, one or more network ports for communication with external devices as well as an input device 124 (e.g., keyboard, mouse, etc.) and output devices, such as a video display 126. Information handling system 120 may also include one or more buses operable to transmit communications between the various hardware components.

Alternatively, systems and methods of the present disclosure may be implemented, at least in part, with non-transitory computer-readable media 128. Non-transitory computer-readable media 128 may include any instrumentality or aggregation of instrumentalities that may retain data and/or instructions for a period of time. Non-transitory computer-readable media 128 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, rig 112 includes a load cell (not shown) which may determine the amount of pull on conveyance 116 at the surface of wellbore 130. Information handling system 120 may comprise a safety valve which controls the hydraulic pressure that drives drum 132 on vehicle 110 which may reels up and/or release conveyance 116 which may move first downhole tool 102, second downhole tool 104, third downhole tool 106, and/or fourth downhole tool 108 up and/or down wellbore 130. The safety valve may be adjusted to a pressure such that drum 132 may only impart a small amount of tension to conveyance 116 over and above the tension necessary to retrieve conveyance 116 and/or first downhole tool 102, second downhole tool 104, third downhole tool 106, and/or fourth downhole tool 108 from wellbore 130. The safety valve is typically set a few hundred pounds above the amount of desired safe pull on conveyance 116 such that once that limit is exceeded; further pull on conveyance 116 may be prevented.

In examples, first downhole tool 102, second downhole tool 104, third downhole tool 106, and/or fourth downhole tool 108 may comprise a transmitter 134 and/or a receiver 136. In examples, first downhole tool 102, second downhole tool 104, third downhole tool 106, and/or fourth downhole tool 108 may operate with additional equipment (not illustrated) on surface 114 and/or disposed in a separate well measurement system (not illustrated) to record measurements and/or values from formation 138. During operations, transmitter 134 may broadcast a signal from first downhole tool 102, second downhole tool 104, third downhole tool 106, and/or fourth downhole tool 108. Transmitter 134 may be connected to information handling system 120, which may further control the operation of transmitter 134. Additionally, receiver 136 may measure and/or record signals broadcasted from transmitter 134. Receiver 136 may transfer recorded information to information handling system 120. Information handling system 120 may control the operation of receiver 136. For example, the broadcasted signal from transmitter 134 may be reflected by formation 138. The reflected signal may be recorded by receiver 136. The recorded signal may be transferred to information handling system 120 for further processing. In examples, there may be any suitable number of transmitters 134 and/or receivers 136, which may be controlled by information handling system 120. Information and/or measurements may be processed further by information handling system 120 to determine properties of wellbore 130, fluids, and/or formation 138.

Figure 2:
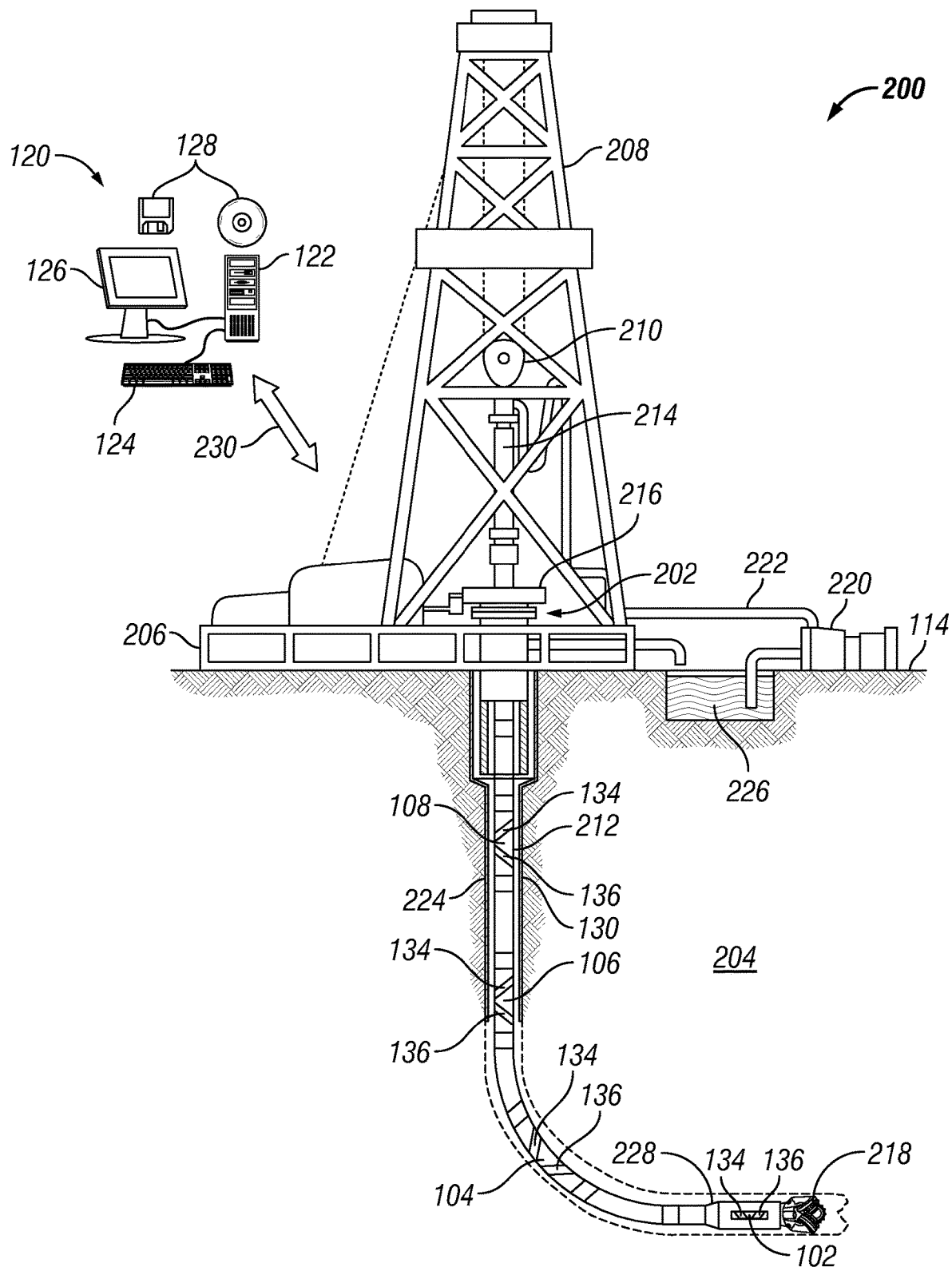
FIG. 2 illustrates another example of a well measurement system.

FIG. 2 illustrates an example in which first downhole tool 102, second downhole tool 104, third downhole tool 106, and/or fourth downhole tool 108 (e.g., Referring to FIG. 1) may be disposed in a drilling system 200. As illustrated, wellbore 130 may extend from a wellhead 202 into a subterranean formation 204 from surface 114 (e.g., Referring to FIG. 1). Generally, wellbore 130 may include horizontal, vertical, slanted, curved, and other types of wellbore geometries and orientations. Wellbore 130 may be cased or uncased. In examples, wellbore 130 may comprise a metallic material. By way of example, the metallic member may be a casing, liner, tubing, or other elongated steel tubular disposed in wellbore 130.

As illustrated, wellbore 130 may extend through subterranean formation 204. As illustrated in FIG. 2, wellbore 130 may extending generally vertically into the subterranean formation 204, however wellbore 130 may extend at an angle through subterranean formation 204, such as horizontal and slanted wellbores. For example, although FIG. 2 illustrates a vertical or low inclination angle well, high inclination angle or horizontal placement of the well and equipment may be possible. It should further be noted that while FIG. 2 generally depicts a land-based operation, those skilled in the art may recognize that the principles described herein are equally applicable to subsea operations that employ floating or sea-based platforms and rigs, without departing from the scope of the disclosure.

As illustrated, a drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 114. Without limitation, drill bit 218 may include, roller cone bits, PDC bits, natural diamond bits, any hole openers, reamers, coring bits, and the like. As drill bit 218 rotates, it may create and extend wellbore 130 that penetrates various subterranean formations 204. A pump 220 may circulate drilling fluid through a feed pipe 222 to kelly 214, downhole through interior of drill string 212, through orifices in drill bit 218, back to surface 114 via annulus 224 surrounding drill string 212, and into a retention pit 226.

With continued reference to FIG. 2, drill string 212 may begin at wellhead 202 and may traverse wellbore 130. Drill bit 218 may be attached to a distal end of drill string 212 and may be driven, for example, either by a downhole motor and/or via rotation of drill string 212 from surface 114 (e.g., Referring to FIG. 1). Drill bit 218 may be a part of bottom hole assembly 228 at distal end of drill string 212. Bottom hole assembly 228 may further comprise first downhole tool 102 (e.g., Referring to FIG. 1). First downhole tool 102 may be disposed on the outside and/or within bottom hole assembly 228. It should be noted that second downhole tool 104, third downhole tool 106, and/or fourth downhole tool 108 may be disposed on drill string 212. Second downhole tool 104, third downhole tool 106, and/or fourth downhole tool 108 may be disposed on the outside and/or within drill string 212. First downhole tool 102, second downhole tool 104, third downhole tool 106, and/or fourth downhole tool 108 may comprise a transmitter 134 and/or a receiver 136 (e.g., Referring to FIG. 1). It should be noted that first downhole tool 102, second downhole tool 104, third downhole tool 106, and/or fourth downhole tool 108 may comprise a plurality of transmitters 134 and/or receivers 136. Transmitters 134 and/or receivers 136 may operate and/or function as described above. As will be appreciated by those of ordinary skill in the art, first downhole tool 102, second downhole tool 104, third downhole tool 106, and/or fourth downhole tool 108 may be a measurement-while drilling (MWD) or logging-while-drilling (LWD) system.

Without limitation, first downhole tool 102, second downhole tool 104, third downhole tool 106, and/or fourth downhole tool 108, transmitters 134, and/or receiver 136 may be connected to and/or controlled by information handling system 120 (e.g., Referring to FIG. 1), which may be disposed on surface 114. Without limitation, information handling system 120 may be disposed down hole in first downhole tool 102, second downhole tool 104, third downhole tool 106, and/or fourth downhole tool 108. Processing of information recorded may occur down hole and/or on surface 114. Processing occurring downhole may be transmitted to surface 114 to be recorded, observed, and/or further analyzed. Additionally, information recorded on information handling system 120 that may be disposed down hole may be stored until first downhole tool 102, second downhole tool 104, third downhole tool 106, and/or fourth downhole tool 108 may be brought to surface 114. In examples, information handling system 120 may communicate with first downhole tool 102, second downhole tool 104, third downhole tool 106, and/or fourth downhole tool 108 through a communication line (not illustrated) disposed in (or on) drill string 212. In examples, wireless communication may be used to transmit information back and forth between information handling system 120 and first downhole tool 102, second downhole tool 104, third downhole tool 106, and/or fourth downhole tool 108. Information handling system 120 may transmit information to first downhole tool 102, second downhole tool 104, third downhole tool 106, and/or fourth downhole tool 108 and may receive as well as process information recorded by first downhole tool 102, second downhole tool 104, third downhole tool 106, and/or fourth downhole tool 108. In examples, a downhole information handling system (not illustrated) may include, without limitation, a microprocessor or other suitable circuitry, for estimating, receiving and processing signals from first downhole tool 102, second downhole tool 104, third downhole tool 106, and/or fourth downhole tool 108. Downhole information handling system (not illustrated) may further include additional components, such as memory, input/output devices, interfaces, and the like. In examples, while not illustrated, first downhole tool 102, second downhole tool 104, third downhole tool 106, and/or fourth downhole tool 108 may include one or more additional components, such as analog-to-digital converter, filter and amplifier, among others, that may be used to process the measurements of first downhole tool 102, second downhole tool 104, third downhole tool 106, and/or fourth downhole tool 108 before they may be transmitted to surface 114. Alternatively, raw measurements from first downhole tool 102, second downhole tool 104, third downhole tool 106, and/or fourth downhole tool 108 may be transmitted to surface 114.

Any suitable technique may be used for transmitting signals from first downhole tool 102, second downhole tool 104, third downhole tool 106, and/or fourth downhole tool 108 to surface 114, including, but not limited to, wired pipe telemetry, mud-pulse telemetry, acoustic telemetry, and electromagnetic telemetry. While not illustrated, first downhole tool 102, second downhole tool 104, third downhole tool 106, and/or fourth downhole tool 108 may include a telemetry subassembly that may transmit telemetry data to surface 114. Without limitation, an electromagnetic source in the telemetry subassembly may be operable to generate pressure pulses in the drilling fluid that propagate along the fluid stream to surface 114. At surface 114, pressure transducers (not shown) may convert the pressure signal into electrical signals for a digitizer (not illustrated). The digitizer may supply a digital form of the telemetry signals to information handling system 120 via a communication link 230, which may be a wired or wireless link. The telemetry data may be analyzed and processed by information handling system 120.

As illustrated, communication link 230 (which may be wired or wireless, for example) may be provided that may transmit data from first downhole tool 102, second downhole tool 104, third downhole tool 106, and/or fourth downhole tool 108 to an information handling system 120 at surface 114. Information handling system 120 may include a central processing unit 122 (e.g., Referring to FIG. 1), a video display 126 (e.g., Referring to FIG. 1), an input device 124 (e.g., keyboard, mouse, etc.) (e.g., Referring to FIG. 1), and/or non-transitory computer-readable media 128 (e.g., optical disks, magnetic disks) (e.g., Referring to FIG. 1) that may store code representative of the methods described herein. In addition to, or in place of processing at surface 114, processing may occur downhole.

First downhole tool 102, second downhole tool 104, third downhole tool 106, and/or fourth downhole tool 108 may comprise a transmitter 134 and/or a receiver 136. In examples, first downhole tool 102, second downhole tool 104, third downhole tool 106, and/or fourth downhole tool 108 may operate with additional equipment (not illustrated) on surface 114 and/or disposed in a separate well measurement system (not illustrated) to record measurements and/or values from subterranean formation 204. During operations, transmitter 134 may broadcast a signal from first downhole tool 102, second downhole tool 104, third downhole tool 106, and/or fourth downhole tool 108. Transmitter 134 may be connected to information handling system 120, which may further control the operation of transmitter 134. Additionally, receiver 136 may measure and/or record signals broadcasted from transmitter 134. Receiver 136 may transfer recorded information to information handling system 120. Information handling system 120 may control the operation of receiver 136. For example, the broadcasted signal from transmitter 134 may be reflected by subterranean formation 204. The reflected signal may be recorded by receiver 136. The recorded signal may be transferred to information handling system 120 for further processing. In examples, there may be any suitable number of transmitters 134 and/or receivers 136, which may be controlled by information handling system 120. Information and/or measurements may be processed further by information handling system 120 to determine properties of wellbore 130 (e.g., Referring to FIG. 1), fluids, and/or subterranean formation 204.

Figure 3:
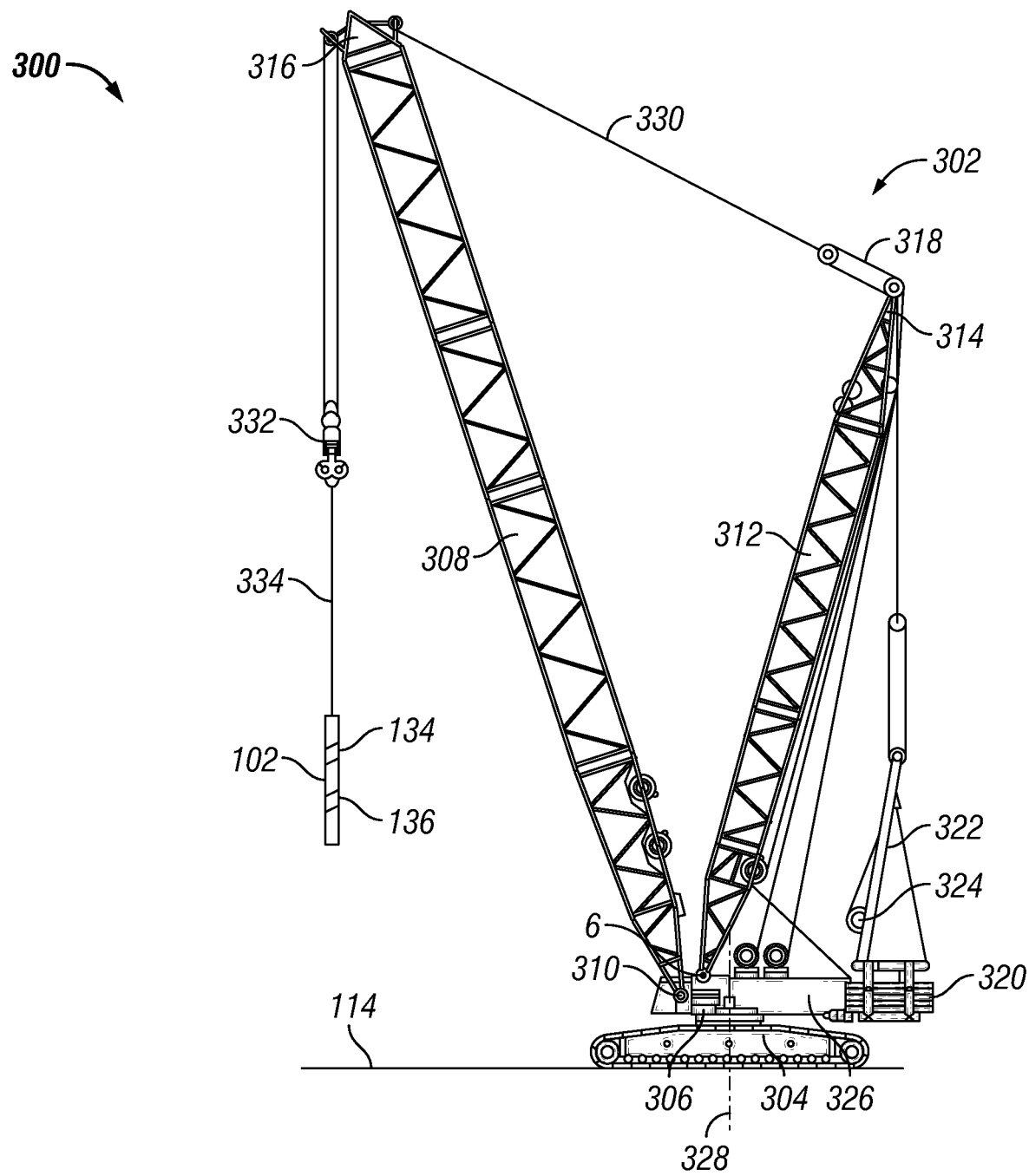
FIG. 3 illustrates an example of an air hang calibration system.

During operations, at least first downhole tool 102 may be calibrated before being utilized in well measurement system 100 and/or drilling system 200. It should be noted that any number of downhole tools may be calibrated before being used in well measurement system 100 and/or drilling system 200. Specifically, second downhole tool 104, third downhole tool 106, and/or fourth downhole tool 108. As illustrated in FIG. 3, air calibration 300 may be utilized to calibrate first downhole tool 102, second downhole tool 104, third downhole tool 106, and/or fourth downhole tool 108. As illustrated, a crane 302 may comprise an undercarriage 304, and a superstructure 306 mounted thereon with freedom to revolve. At a forward end of superstructure 306, a boom 308 may be attached by a hinged joint 310. A mast 312 may also attach to hinged joint 310. A tip 314 of the mast 312 may be connected to head 316 of boom 308 by guying 318 of adjustable length. Tip 314 of mast 312 may be connected by way of guying 318, also of adjustable length, to a counterweight 320. Guying 318 may be connected to counterweight 320 by way of a support 322, between the sides of which a winch 324 may adjust the length of guying 318. A stationary frame 326, may be mounted on superstructure 306 and may be connected to superstructure 306 in a gravity-actuated manner by means of two bearing blocks 328, which may allow superstructure 306 to swivel. A cable 330 may connect to superstructure 306 and may traverse through tip 314 and head 316 to connector 332. Connector 332 may be a hook, shackle, and/or any suitable device to connect an object to cable 330.

A support line 334 may connect first downhole tool 102 to connector 332. First downhole tool 102 may comprise transmitter 134 and/or receiver 136. (e.g., Referring to FIG. 1) As noted above, first downhole tool 102 may comprise a plurality of transmitters 134 and/or a plurality of receivers 136. It should be noted, that second downhole tool 104, third downhole tool 106, fourth downhole tool 108, and/or any other suitable number of downhole tools may be attached to crane 302 for air hang calibration. Air hang calibration may allow for interpolation of formation parameters from responses recorded by receiver 136. Interpreting and/or inverting formation parameters may be found through a database and/or calculating modeling responses that match responses recorded by receiver 136. However, there may be an offset between a recorded response and a modeled response and/or recordings in a database. The offset may be caused by factors such as electronics offset, mandrel effect, and/or imperfect dipole coil from the construction of first downhole tool 102 (as well as second downhole tool 104, third downhole tool 106, fourth downhole tool 108). Thus, air hang calibration may be utilized to calibrate first downhole tool 102, second downhole tool 104, third downhole tool 106, and/or fourth downhole tool 108 to remove the offset from recordings by receiver 136

Air-hang calibration may be employed to calibrate first downhole tool 102, second downhole tool 104, third downhole tool 106, and/or fourth downhole tool 108. The air response of first downhole tool 102, second downhole tool 104, third downhole tool 106, and/or fourth downhole tool 108 is directly linked to the offset. This may provide a baseline for the response of first downhole tool 102, second downhole tool 104, third downhole tool 106, and/or fourth downhole tool 108, which may be calibrated. Calibrating the offset may allow the recorded responses of first downhole tool 102, second downhole tool 104, third downhole tool 106, and/or fourth downhole tool 108 match model response. However, for a modularized deep resistivity tool, which may comprise first downhole tool 102, second downhole tool 104, third downhole tool 106, and/or fourth downhole tool 108, the air-hang calibration methods may be difficult to implement.

Figure 4:
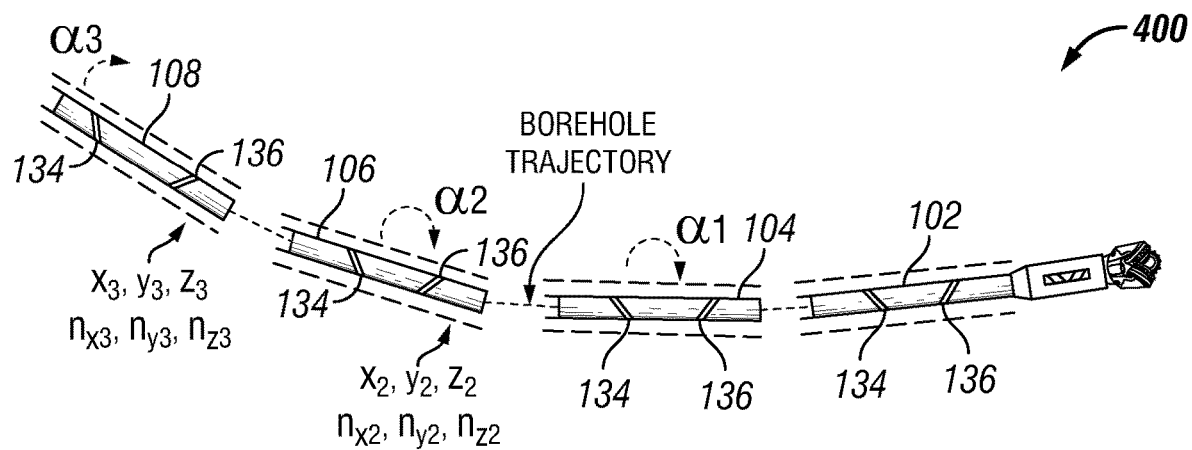
FIG. 4 illustrates an example of a plurality of downhole tools.

For examples, as illustrated in FIG. 4, a logging tool 400 may comprise first downhole tool 102, second downhole tool 104, third downhole tool 106, and/or fourth downhole tool 108 (e.g., Referring to FIG. 1). As illustrated, longer spacing between transmitters 134 and/or receiver 136 between first downhole tool 102, second downhole tool 104, third downhole tool 106, and/or fourth downhole tool 108 may make it difficult to hang the whole tool string in the air (e.g., Referring to FIG. 3). Low-frequency and long spacing may make it difficult to avoid ground/rig reflection. Thus, larger distances between logging tool 400, surface 114, and crane 302 may be required for air-hang calibration (e.g., Referring to FIGS. 1 and 3). Additionally, air-hang calibration may not account for all the measurements. Transmitters 134 and receivers 136 for modularized first downhole tool 102, second downhole tool 104, third downhole tool 106, and/or fourth downhole tool 108 may be assembled separately on first downhole tool 102, second downhole tool 104, third downhole tool 106, and/or fourth downhole tool 108. Thus, as illustrated in FIG. 4, air hang calibration may not take into consideration spacing between transmitter 134 and receiver 136, depending on spacing and inclinations in between first downhole tool 102, second downhole tool 104, third downhole tool 106, and/or fourth downhole tool 108. Additionally, first downhole tool 102, second downhole tool 104, third downhole tool 106, and/or fourth downhole tool 108 face offset between transmitters 134 and receiver 136 on first downhole tool 102, second downhole tool 104, third downhole tool 106, and/or fourth downhole tool 108. Which may be due to random threaded connections between modularized first downhole tool 102, second downhole tool 104, third downhole tool 106, and/or fourth downhole tool 108. Further, air hang calibration may not take into account dogleg/inclination between transmitters 134 and receivers 136 on first downhole tool 102, second downhole tool 104, third downhole tool 106, and/or fourth downhole tool 108.

In-situ calibration has been proposed to calibrate for what air hang calibration cannot. In-situ calibration may require an accurate measurement from an outside tool, not illustrated, to invert the parameters of a formation. Then the formation parameters may generate the modeling response as a reference to calibrate the response of first downhole tool 102, second downhole tool 104, third downhole tool 106, and/or fourth downhole tool 108. However, in-situ calibration may not accurately determine the formation parameters through an outside tool because of different DOI (Depth of Investigation) between a deep reading tool, such as first downhole tool 102, second downhole tool 104, third downhole tool 106, and/or fourth downhole tool 108, and the outside tool. Additionally, a formation may comprise complex structures such as faults (not illustrated) and anisotropy layers (not illustrated), which may make the formation parameters difficult to determine. Thus, in-situ calibration may only be available from certain tool configurations and positions, it may not work for other tool configurations/positions from different sections of the wellbore 130. (e.g., Referring to FIGS. 1 and 2).

A component-based look-up table calibration method may allow for calibration of a logging tool 400 (e.g., Referring to FIG. 4) comprising first downhole tool 102, second downhole tool 104, third downhole tool 106, and/or fourth downhole tool 108. For logging tool 400 with tilted transmitter 134 and receiver 136 (normally LWD tool, e.g., referring to FIG. 2), or logging tool 400 with transmitter 134, which may be tri-axial, and receiver 136 (normally a conveyance, e.g., referring to FIG. 1), responses from first downhole tool 102, second downhole tool 104, third downhole tool 106, and/or fourth downhole tool 108 may be broken into the following components:

$$\begin{bmatrix} Z_{XX} & Z_{XY} & Z_{XZ} \\ Z_{YX} & Z_{YY} & Z_{YZ} \\ Z_{ZX} & Z_{ZY} & Z_{ZZ} \end{bmatrix} \quad (1)$$

where Z symbolizes mutual impedance which is complex number, $Z_{xx}$, $Z_{yy}$, $Z_{zz}$ are known as the direct-coupling components and $Z_{xy}$, $Z_{yx}$, $Z_{xz}$, $Z_{zx}$, $Z_{yz}$, $Z_{zy}$ are known as the cross-coupling components.

Figure 5:
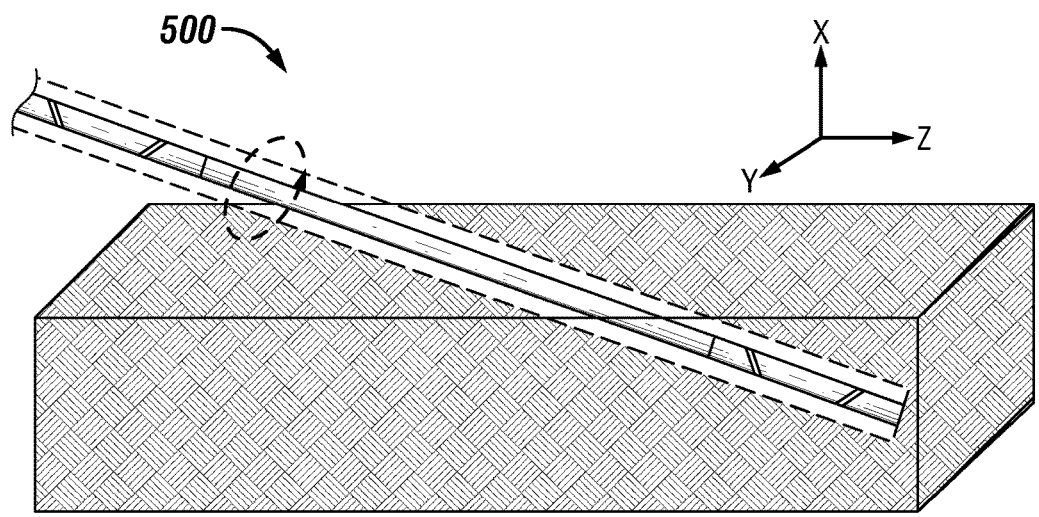
FIG. 5 illustrate a downhole tool in an orientation schematic.

Based on rotating model 500, which may represent first downhole tool 102, second downhole tool 104, third downhole tool 106, and/or fourth downhole tool 108, in FIG. 5, any response from any transmitter 134 and receiver 136 combinations may be produced from the components:

$$Z_R(\beta) = \begin{bmatrix} \sin\theta_t\cos\beta \\ \sin\theta_t\sin\beta \\ \cos\theta_t \end{bmatrix}^T \begin{bmatrix} Z_{xx} & Z_{yx} & Z_{zx} \\ Z_{xy} & Z_{yy} & Z_{zy} \\ Z_{xz} & Z_{yz} & Z_{zz} \end{bmatrix} \begin{bmatrix} \sin\theta_r\cos(\beta+\beta_{ref}) \\ \sin\theta_r\sin(\beta+\beta_{ref}) \\ \cos\theta_r \end{bmatrix} \quad (2)$$

where $Z_R(\beta)$ is the response for a transmitter 134-receiver 136 pair at first downhole tool 102, second downhole tool 104, third downhole tool 106, and/or fourth downhole tool 108 bin azimuth, β is first downhole tool 102, second downhole tool 104, third downhole tool 106, and/or fourth downhole tool 108 rotating azimuth, $\beta_{ref}$ is first downhole tool 102, second downhole tool 104, third downhole tool 106, and/or fourth downhole tool 108 face offset between transmitter 134 and receiver 136, $\theta_t$ is the tilt angle of transmitter 134, $\theta_r$ is the tilt angle of receiver 136.

For reference, the air response of first downhole tool 102, second downhole tool 104, third downhole tool 106, and/or fourth downhole tool 108 when they are hung in air may be further simplified from Equation 2 as:

$$Z_{AIR} = \sin\theta_t \sin\theta_r \cos\beta_{ref} Z_{xx} + \cos\theta_t \cos\theta_r Z_{zz} \quad (3)$$

As in Equation 3, any air-hang response of first downhole tool 102, second downhole tool 104, third downhole tool 106, and/or fourth downhole tool 108 may be calculated from component $Z_{xx}$ and $Z_{zz}$, no matter the face of first downhole tool 102, second downhole tool 104, third downhole tool 106, and/or fourth downhole tool 108 and tilt angle for transmitter 134 and receiver 136. As a result, a database may be generated for $Z_{xx}$ and $Z_{zz}$ with respect to transmitter 134 and receiver 136 spacing at nominated frequencies. Thus, a database may be generated which enables an operator to calculate air-hung responses for any configuration and/or position of first downhole tool 102, second downhole tool 104, third downhole tool 106, and/or fourth downhole tool 108.

Producing a component-based air-hang database, it may be neither easy nor cost-efficient to perform an air-hang calibration test for all the transmitter 134 and receiver 136 spacing. Additionally, a rough interpolation with limited points of air-hang data may not be accurate enough, specifically if extrapolation may be utilized. As a result, an operator may first generate air-hang modeling responses for $Z_{xx}$ and $Z_{zz}$, with respect to all spacing between transmitters 134 and receivers 136. This may allow an operator to build a complete air-hung modeling database. A second step is to perform interpolation between limited points of air-hung data to a complete modeling database, which may be used to map a final air-hang database.

Figure 6:
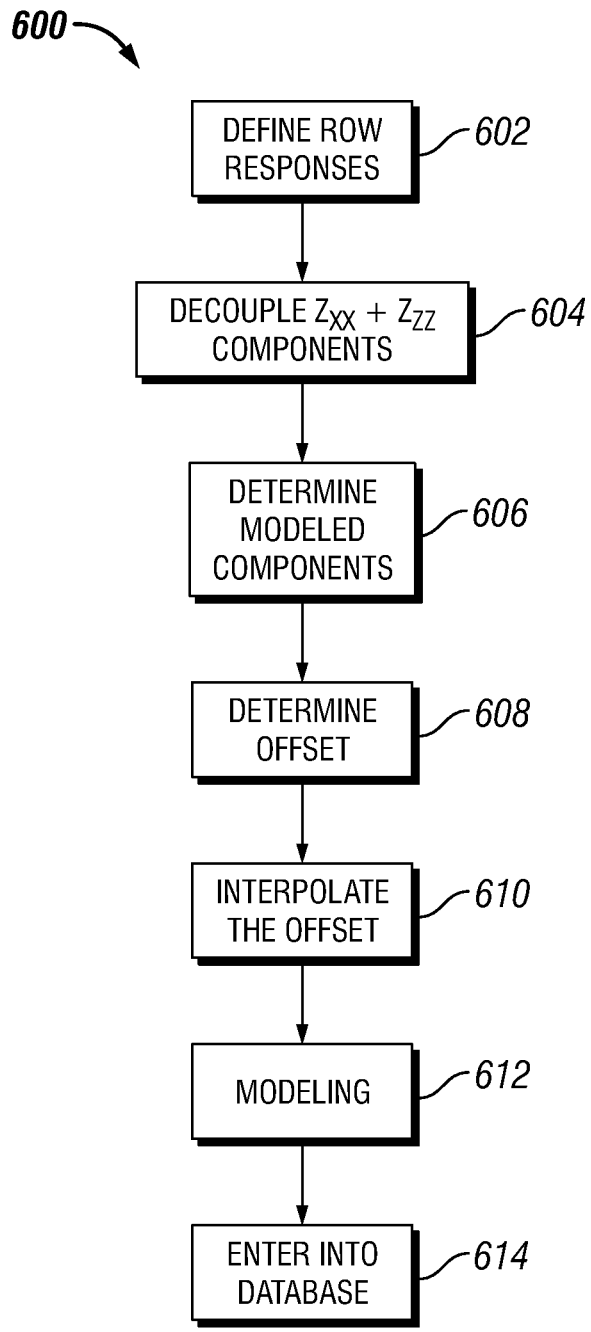
FIG. 6 illustrates a flowchart to determine a calibration database.

FIG. 6 illustrates steps to create a component-based look-up table calibration 600. In step 602, raw responses from logging tool 400 (e.g., Referring to FIG. 4) are recorded. Response may be determined by $Pha_{test}(s, f)$ and $Amp_{test}(s, f)$ at nominated spacing (s) and frequencies (f) via air-hang test. (s=25', 50', 75' . . . , f=2 kHz, 8 kHz, 32 kHz . . . ) In step 604, there may be decoupling of $Z_{xx}$ and $Z_{zz}$ components. This may be determined from components $Pha_{test}(s, f, Z_{xx}, Z_{zz})$ and $Amp_{test}(s, f, Z_{xx}, Z_{zz})$ from the raw air-hang response. Step 606 may determine modeled components from logging tool 400 by $Pha_{model}(s, f, Z_{xx}, Z_{zz})$ and $Amp_{model}(s, f, Z_{xx}, Z_{zz})$ with the same configurations/positions and the same spacing and frequencies. In step 608 an offset between an air-hang test components and modeled components may be determined. The offset may physically represents gain/phase offset from tool construction such as electronics/mechanics offsets. These offset may be constant/linear w.r.t spacings according to empirical data. Offsets may be found through $Phase_{diff}(s, f, Z_{xx}, Z_{zz}) = Pha_{test}(s, f, Z_{xx}, Z_{zz}) - Pha_{model}(s, f, Z_{xx}, Z_{zz})$ and $Amp_{diff}(s, f, Z_{xx}, Z_{zz}) = Amp_{test}(s, f, Z_{xx}, Z_{zz}) - Amp_{model}(s, f, Z_{xx}, Z_{zz})$. In step 610, an interpolation of the offset between the air-hung test and modeling may be performed, wherein the spacing is the same. Interpolation may be found through $Pha_{diff}(s_{all}, f, Z_{xx}, Z_{zz}) = interpolate(Pha_{diff}(s, f, Z_{xx}, Z_{zz}))$ and $Amp_{diff}(s_{all}, f, Z_{xx}, Z_{zz}) = interpolate(Amp_{diff}(s, f, Z_{xx}, Z_{zz}))$. In step 612, modeling may be performed to generate complete air-hang modeling database with each spacing, which may be found utilizing $Pha_{model}(s_{all}, f, Z_{xx}, Z_{zz})$ and $Amp_{model}(s_{all}, f, Z_{xx}, Z_{zz})$. In step 614, the interpolation may be stored in a database. For example, the interpolated offset may be utilized to complete an air-hang modeling database utilizing $Pha_{test}(s_{all}, f, Z_{xx}, Z_{zz}) = Pha_{model}(s_{all}, f, Z_{xx}, Z_{zz}) + Phase_{diff}(s_{all}, frequency, Z_{xx}, Z_{zz})$ and $Amp_{test}(s_{all}, f, Z_{xx}, Z_{zz}) = Amp_{model}(s_{all}, f, Z_{xx}, Z_{zz}) + Amp_{diff}(s_{all}, frequency, Z_{xx}, Z_{zz})$.

Figure 7:
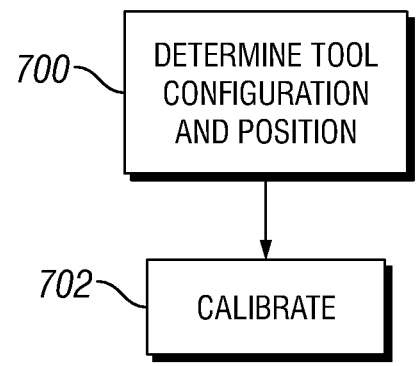
FIG. 7 illustrates a flowchart of utilizing the calibration database.

In FIG. 7, the air-hang modeling database created in FIG. 6 may be applied to logging tool 400 (e.g., Referring to FIG. 4) disposed in a wellbore 130. (e.g., Referring to FIGS. 1 and 2). For example, in Step 702, the previously determined air-hang database may be utilized with a given tool configuration and position of logging tool 400. Thus, spacing $s_0$ and frequency $f_0$ to look up $Zxx(s_0, f_0)$ and $Z_{zz}(s_0, f_0)$ from database $Pha_{test}(s_{all}, f, Z_{xx}, Z_{zz})$ and $Amp_{test}(s_{all}, f, Z_{xx}, Z_{zz})$. Tool face offset $\beta_{ref}$, transmitter tilt angle $\theta_t$, receiver tilt angle $\theta_r$, the raw air-hang response may then be calculated from Equation 3, shown below:

$$Z_{AIR}(s_0, f_0, \beta_{ref}, \theta_t, \theta_r) = \sin\theta_t \sin\theta_r \cos\beta_{ref} Z_{xx}(s_0, f_0) + \cos\theta_t \cos\theta_r Z_{zz}(s_0, f_0)$$

In step 702, logging tool 400 (e.g., Referring to FIG. 4), comprising first downhole tool 102, second downhole tool 104, third downhole tool 106, and/or fourth downhole tool 108, may be recorded with a raw tool response $Z_{raw}$, which may be utilized to calibrate calculated air response through $Z_{AIR}:Z_{cal} = Z_{raw}/Z_{AIR}$.

This method and system may include any of the various features of the compositions, methods, and system disclosed herein, including one or more of the following statements.

Statement 1: A method for building a calibration database may comprise hanging a logging tool in air; determining a raw response from the logging tool; decoupling a $Z_{xx}$ component and a $Z_{zz}$ component from the raw response; creating a modeled component from the $Z_{xx}$ component and the $Z_{zz}$ component; calculating an offset from the modeled component; interpolating the offset; modeling a response from the logging tool with the offset; and entering the response into a database.

Statement 2: The method of statement 1, further comprising: disposing the logging tool into a wellbore with a drilling system; determining a configuration and a position of the logging tool; and calibrating the logging tool with the database.

Statement 3: The method of statement 1 or statement 2, wherein the logging tool is disposed on a drill string.

Statement 4: The method of any preceding statement, further comprising: disposing the logging tool into a wellbore with a conveyance; determining a configuration and position of the logging tool; and calibrating the logging tool with the database.

Statement 5: The method of any preceding statement, wherein the conveyance is a wireline.

Statement 6: The method of any preceding statement, wherein determining the configuration and position of the logging tool comprises finding a spacing and a frequency of the logging tool and comparing the spacing and the frequency to the database.

Statement 7: The method of any preceding statement, wherein determining the configuration and position of the logging tool further comprises finding a tool face offset, a transmitter tilt angle, and a receiver tilt angle.

Statement 8: The method of any preceding statement, wherein the logging tool comprises a first downhole tool.

Statement 9: The method of any preceding statement, wherein the logging tool comprises at least a second downhole tool.

Statement 10: The method of any preceding statement, wherein the logging tool comprises a third downhole tool and a fourth downhole tool.

Statement 11: A well measurement system for calibrating a logging tool may comprise: a logging tool, wherein the logging tool comprises: a first downhole tool; a receiver; and a transmitter; a conveyance, wherein the conveyance is attached to the logging tool; and an information handling system, wherein the information handling system is configured to determine a raw response from the logging tool, decouple a $Z_{xx}$ component and a $Z_{zz}$ component from the raw response, create a modeled component from the $Z_{xx}$ component and the $Z_{zz}$ component; calculate an offset from the modeled component, interpolate the offset, model a response from the logging tool with the offset, and enter the response into a database.

Statement 12: The well measurement system of statement 11, wherein the logging tool comprises at least a second downhole tool.

Statement 13: The well measurement system of statement 11 or statement 12, wherein the logging tool comprises a third downhole tool and a fourth downhole tool.

Statement 14: The well measurement system of statements 11-13, wherein the information handling system is further configured to determine a position and a configuration of the logging tool.

Statement 15: The well measurement system of statements 11-14, wherein the information handling system calibrates the logging tool from the databased based on the position and the configuration of the logging tool.

Statement 16: The well measurement system of statements 11-15, wherein the conveyance comprises a drill string.

Statement 17: A calibration system comprising: a crane; a logging tool, wherein the logging tool comprises: a first downhole tool; a receiver; and a transmitter; an information handling system, wherein the information handling system is configured to determine a raw response from the logging tool, decouple a $Z_{xx}$ component and a $Z_{zz}$ component from the raw response, create a modeled component from the $Z_{xx}$ component and the $Z_{zz}$ component; calculate an offset from the modeled component, interpolate the offset, model a response from the logging tool with the offset, and enter the response into a database.

Statement 18: The calibration system of statement 17, wherein the information handling system calibrates the logging tool from the database.

Statement 19: The calibration system of statement 17 or statement 18, wherein the information handling system is further configured to determine a position and a configuration of the logging tool.

Statement 20: The calibration system of statements 17-19, wherein the information handling system is further configured to find a tool face offset, a transmitter tilt angle, and a receiver tilt angle.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for building a calibration database comprising:
    hanging a logging tool in air;
    measuring a plurality of raw responses from the logging tool;
    decoupling a $Z_{xx}$ component and a $Z_{zz}$ component from each of the plurality of raw responses;
    creating a modeled component from the $Z_{xx}$ component and the $Z_{zz}$ component;
    calculating a first set of offsets from the modeled component and the plurality of raw responses;
    interpolating the first set of offsets to form a second set of offsets;
    modeling a response from the logging tool with the first set of offsets and the second set of offsets; and
    entering the response into a database.

2. The method of claim 1, further comprising:
    disposing the logging tool into a wellbore with a drilling system;
    determining a configuration and a position of the logging tool; and
    calibrating the logging tool with the database.

3. The method of claim 2, wherein the logging tool is disposed on a drill string.

4. The method of claim 1, further comprising:
    disposing the logging tool into a wellbore with a conveyance;
    determining a configuration and position of the logging tool; and
    calibrating the logging tool with the database.

5. The method of claim 4, wherein the conveyance is a wireline.

6. The method of claim 4, wherein determining the configuration and position of the logging tool comprises finding a spacing and a frequency of the logging tool and comparing the spacing and the frequency to the database.

7. The method of claim 6, wherein determining the configuration and position of the logging tool further comprises finding a tool face offset, a transmitter tilt angle, and a receiver tilt angle.

8. The method of claim 1, wherein the logging tool comprises a first downhole tool.

9. The method of claim 8, wherein the logging tool comprises at least a second downhole tool.

10. The method of claim 9, wherein the logging tool comprises a third downhole tool and a fourth downhole tool.

11. A calibration system comprising:
    a logging tool, wherein the logging tool comprises:
        a first downhole tool;
        a receiver; and
        a transmitter;
    a crane, configured to hang the logging tool in air;
    a conveyance, wherein the conveyance connects the logging tool to the crane; and
    an information handling system, wherein the information handling system is configured to measure a plurality of raw responses from the logging tool, decouple a Zxx component and a Zzz component from each of the plurality of raw responses, create a modeled component from the Zxx component and the Zzz component; calculate a first set of offsets from the modeled component and the plurality of raw responses, interpolate the first set of offsets to form a second set of offsets, model a response from the logging tool with the first set of offsets and the second set of offsets, and enter the response into a database.

12. The well measurement system of claim 11, wherein the logging tool comprises at least a second downhole tool.

13. The well measurement system of claim 12, wherein the logging tool comprises a third downhole tool and a fourth downhole tool.

14. The well measurement system of claim 11, wherein the information handling system is further configured to determine a position and a configuration of the logging tool.

15. The well measurement system of claim 14,
    wherein the information handling system calibrates the logging tool from the database based on the position and the configuration of the logging tool.

16. The well measurement system of claim 11, wherein the conveyance comprises a drill string.

17. The method of claim 11, wherein the information handling system is further configured to determine a configuration and a position of the logging tool by finding a spacing and a frequency of the logging tool and comparing the spacing and the frequency to the database.

18. The method of claim 17, wherein the information handling system is further configured to determine a tool face offset, a transmitter tilt angle, and a receiver tilt angle.

* * * * *